United States Patent
Cohen et al.

(10) Patent No.: US 10,569,420 B1
(45) Date of Patent: Feb. 25, 2020

(54) INTERFACING WITH AUTONOMOUS DEVICES

(71) Applicant: X Development LLC, Mountain View, CA (US)

(72) Inventors: Gabriel A. Cohen, Alameda, CA (US); Pavel Vodenski, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 259 days.

(21) Appl. No.: 15/632,107

(22) Filed: Jun. 23, 2017

(51) Int. Cl.
| | |
|---|---|
| *G05B 15/00* | (2006.01) |
| *G05B 19/00* | (2006.01) |
| *B25J 13/08* | (2006.01) |
| *G06F 3/0484* | (2013.01) |
| *G06F 3/0487* | (2013.01) |
| *B25J 9/16* | (2006.01) |
| *B25J 11/00* | (2006.01) |

(52) U.S. Cl.
CPC .............. *B25J 13/084* (2013.01); *B25J 9/16* (2013.01); *B25J 11/0005* (2013.01); *B25J 13/086* (2013.01); *B25J 13/088* (2013.01); *G06F 3/0484* (2013.01); *G06F 3/0487* (2013.01); *G05B 2219/40202* (2013.01)

(58) Field of Classification Search
CPC ........ B25J 13/084; B25J 9/16; B25J 11/0005; B25J 13/086; G06F 3/0484; G06F 3/0487; G05B 2219/40202
See application file for complete search history.

(56) References Cited

U.S. PATENT DOCUMENTS

| | | | |
|---|---|---|---|
| 7,203,486 B2 | 4/2007 | Patel | |
| 8,452,451 B1 * | 5/2013 | Francis, Jr. | ............ B25J 9/1658 700/245 |
| 8,676,121 B1 * | 3/2014 | Monte | .................... H04B 7/155 455/41.2 |
| 8,942,849 B2 | 1/2015 | Maisonnier et al. | |
| 9,375,845 B1 * | 6/2016 | Annan | ................. B25J 11/0005 |

(Continued)

OTHER PUBLICATIONS

'www.wired.com' [online] "Meet Iorek, the Robot that Communicates in a Remarkable Way," Matt Simon, Science, Mar. 20, 2017, [retrieved on Jul. 11, 2017] Retrieved from the Internet: URL<https://www.wired.com/2017/03/meet-lorek-robot-communicates-remarkable-way/> 3 pages.

(Continued)

*Primary Examiner* — Harry Y Oh
(74) *Attorney, Agent, or Firm* — Fish & Richardson P.C.

(57) ABSTRACT

Methods, systems, and apparatus, including computer programs stored on a computer-readable storage medium, for selecting a modality for interfacing between a user and a robot. In some implementations, a system determines that a particular action requires user confirmation before being performed. The system receives position data indicating a level of proximity of a user to a robot and environmental data indicating environmental conditions sensed by the robot. The system selects a particular mode for obtaining confirmation of the action from among multiple modes of interfacing with users based on one or more of the position data and the environmental data. The system provides a request confirmation of the action using the particular mode for presentation to the user.

20 Claims, 5 Drawing Sheets

(56) References Cited

U.S. PATENT DOCUMENTS

| | | | |
|---|---|---|---|
| 9,547,425 B2 | 1/2017 | Wilson et al. | |
| 2007/0192910 A1* | 8/2007 | Vu | B25J 5/007 |
| | | | 700/245 |
| 2008/0077865 A1 | 3/2008 | Hiles et al. | |
| 2010/0318576 A1 | 12/2010 | Kim | |
| 2011/0245974 A1* | 10/2011 | Kawamoto | B25J 9/1664 |
| | | | 700/259 |
| 2013/0343640 A1* | 12/2013 | Buehler | B25J 9/0087 |
| | | | 382/155 |
| 2015/0100157 A1* | 4/2015 | Houssin | G10L 15/1815 |
| | | | 700/246 |
| 2015/0217449 A1* | 8/2015 | Meier | B25J 9/1602 |
| | | | 700/257 |
| 2017/0113353 A1* | 4/2017 | Monceaux | G10L 13/027 |
| 2017/0125008 A1* | 5/2017 | Maisonnier | B25J 11/003 |
| 2017/0228520 A1* | 8/2017 | Kidd | G06F 19/3481 |
| 2017/0372705 A1* | 12/2017 | Lin | B25J 9/0003 |

OTHER PUBLICATIONS

Schilit et al. "Context-Aware Computing Applications," Mobile Computing Systems and Applications, Dec. 8, 1994, 6 pages.
Schweitzer et al. "Optimization of Army-Navy/Portable Special Search (AN/pSS)—14 Operator Training," Army Research Laboratory ARL-TR-3970, Oct. 2006, 88 pages.

* cited by examiner

INTERFACING WITH AUTONOMOUS DEVICES

BACKGROUND

Autonomous devices, such as robots, require user input to perform some actions. For example, a robot may require a user input to confirm that a particular action should be performed or to obtain required user specific information to perform an action. At times, a user may not be readily available to the robot in order to provide the needed input. Accordingly, the robot's operations may be delayed until a user is available.

SUMMARY

A system can select an appropriate modality for interfacing between an autonomous device, such as a robot, and a user based on a current context of the user and a current context of the device (e.g., robot). For example, a robot and a remote server can exchange information to determine whether a human user is near the robot, and choose an appropriate user interfacing modality to obtain input from the user. For example, if the user is determined to be near the robot, an audible or visual request for input may be provided. If the user is not near the robot, a request for input can be output on a mobile device of the user or sent in a message to an electronic address for the user.

In general, a robot can notify a user through different modes of communication mediums depending upon the presence of users near the robot. When user input is needed, e.g., to confirm or authorize an action of a robot, the request for input may take different forms. For example, if the robot determines that a user is in the same room as the robot, the robot can employ an audio interfacing modality to obtain the input. If the robot determines that the user is in another room, the robot can output an audio request at a higher volume or move to the location of the user. If the robot determines that the user is not in the same building, the robot or a server system can send a text message or other message to the user, or cause an application on the user's mobile device to request the needed input from the user.

In some implementations, when the robot needs to interface with the user (e.g., to obtain a security confirmation or to confirm a command), the robot determines its own status and the status of the user in relation to the system. For example, the robot determines the location of the user relative to the system. The robot can determine its location with respect to the location of the user. The robot then identifies a set of available interfacing modalities that can be employed based on the determined context, and selects the most appropriate modality for a given context. For example, if the user is within sight of the robot possible interfacing modalities may include speech, a graphical user interface, a gesture based interface, or a touch based interface. If the user is not within sight of the robot, the robot may select from a different set of interfacing modalities including, e.g., audio (e.g., speech), using a remote interface (e.g., a mobile phone app), or navigating the robot to the user's location and interfacing with the user by the graphical user interface, gesture based interface, or touch based interface. If the user is not within sight of the robot and is not close enough for the robot to navigate to the user (e.g., the user is away from home), then the interfacing possibilities will only include remote interfacing options.

In some implementations, the robot can take into account the identity of a nearby user, e.g., as determined through facial recognition, to determine whether a nearby human is able to provide the needed information, i.e., to determine if a nearby human is the user from whom an input is required. Similarly, the robot can use image data to determine which communication mode is appropriate, e.g., to use an audible request rather than a visual request if the user is facing away from the robot or to accommodate a handicap of the user (e.g., if the user is recognized to be a user who is visually impaired).

In some implementations, the process of selecting a communication mode can be abstracted from software developers so that the mode does not need to be predetermined or selected by applications. For example, in some implementations the techniques and processes described herein can be implemented as an application program interface (API). The API can define a function or set of functions for requesting input or confirmation from a user. Each time this function is called, the robot and/or server system executes the API to determine an interfacing mode appropriate for the current status of the robot and the user. As a result, software developers can use the standard function in the API which will cause the system to dynamically select an appropriate communication mode each time the function is called.

In general, innovative aspects of the subject matter described in this specification can be embodied in methods that include the actions of determining that a particular action requires user confirmation before being performed, receiving position data indicating a level of proximity of a user to a robot and environmental data indicating environmental conditions sensed by the robot, selecting, by the one or more processors and based on one or more of the position data and the environmental data, a particular mode for obtaining confirmation of the action from among multiple modes of interfacing with users, and providing, by the one or more processors and for presentation to the user, an input request for the action using the particular mode. Other implementations of this aspect include corresponding systems, apparatus, and computer programs, configured to perform the actions of the methods, encoded on computer storage devices. These and other implementations can each optionally include one or more of the following features.

In some implementations, selecting the particular mode for obtaining confirmation of the action from among the multiple modes of interfacing with users includes determining, based on the position data, that the level of proximity between the user and the robot is within a range of one or more direct interfacing modes, and based on determining that the level of proximity between the user and the robot is within the range of the one or more direct interfacing modes, selecting the particular mode for obtaining confirmation of the action from among the one or more direct interfacing modes.

In some implementations, the one or more direct interfacing modes include one or more of: an audio mode, a touch mode, or an optical mode.

In some implementations, selecting the particular mode for obtaining confirmation of the action from among the multiple modes of interfacing with users includes determining, based on the position data, that the level of proximity between the user and the robot is outside a range of one or more direct interfacing modes, and based on determining that the level of proximity between the user and the robot is outside the range of one or more direct interfacing modes, selecting the particular mode for obtaining confirmation of the action from among one or more indirect interfacing modes.

In some implementations, the one or more indirect interfacing modes include one or more of: sending a request through mobile application, sending an SMS message, sending an e-mail message, calling a user's telephone, or sending a request through a home assistant device.

In some implementations, selecting the particular mode for obtaining confirmation of the action from among the multiple modes of interfacing with users includes determining, based on the position data, that the level of proximity between the user and the robot is outside of a range of one or more direct interfacing modes, determining that the robot can navigate to a distance that is within the range of one or more direct interfacing modes, causing the robot to navigate closer to the user and within range of a direct interfacing mode, and selecting the direct interfacing mode.

In some implementations, determining that the robot can navigate to a distance that is within the range of one or more direct interfacing modes includes determining, based on the environmental data, that the robot can navigate to a distance that is within the range of one or more direct interfacing modes. In some implementations, the environmental data indicates conditions in a region proximate to the robot.

In some implementations, the process includes obtaining user status data indicating a non-location based status of the user, where the particular mode for obtaining confirmation of the action is selected from among the one or more direct interfacing modes includes selecting based on both the position data and the user status data. In some implementations, selecting the particular mode for obtaining confirmation of the action from among the multiple modes of interfacing with users includes determining, based on the position data, that a distance between the user and the robot within a range of one or more direct interfacing modes, determining, based on the user status data, that the user is unable to see an optical interfacing modes, and selecting the particular mode for obtaining confirmation of the action from among non-optical modes of the one or more direct interfacing modes.

In some implementations, the process includes determining that the particular action that requires confirmation requires privacy, and wherein selecting the particular mode for obtaining confirmation of the action from among the multiple modes of interfacing with users comprises selecting a mode that maintains the user's privacy.

In some implementations, providing the input request for the action using the particular mode includes causing the robot to provide the request.

In some implementations, causing the robot to provide the request includes causing the robot to adjust a characteristic of the particular mode to account for the environmental conditions indicated by the environmental data.

In some implementations, causing the robot to adjust a characteristic of the particular mode to account for the environmental conditions includes causing the robot to adjust a volume for an audio mode.

In some implementations, causing the robot to adjust a characteristic of the particular mode to account for the environmental conditions includes causing the robot to adjust a display for an optical mode.

In some implementations, causing the robot to adjust a characteristic of the particular mode to account for the environmental conditions includes causing the robot to adjust a microphone gain for an audio mode.

In some implementations, causing the robot to adjust a characteristic of the particular mode to account for the environmental conditions includes causing the robot to navigate to within a line of sight of the user for an optical mode.

Another general aspect can be embodied in an autonomous device that includes one or more processors, one or more sensors coupled to the one or more processors, and one or more storage devices coupled to the one or more processors. The storage devices storing instructions that are operable, when executed by the one or more processors, to cause the one or more processors to perform operations including determining that a particular action requires user confirmation before being performed by the device; obtaining sensor data from the one or more sensors, the sensor data indicating environmental conditions in a proximity of the device; receiving position data indicating a level of proximity of a user to the device; obtaining data indicating a particular mode for obtaining confirmation of the action, wherein the particular mode is selected, from among multiple modes of interfacing with users, based on one or more of the position data and the sensor data; and providing, for presentation to the user, an input request for the action using the particular mode.

Particular implementations of the subject matter described in this specification can be implemented so as to realize one or more of the following advantages.

Implementations may reduce down-time of autonomous systems. For example, implementations may reduce or minimize delays in robot operations caused by waiting for input from a user by adapting the user interface modality used to request input to a given context or situation. Implementations may provide more natural interfacing between robots and humans. For example, implementations allow a robot to select user interfacing modalities that are appropriate based on the user's present status. That is, similar to human to human interaction, implementations may permit a robot to choose between different communication modes (e.g., interfacing modalities) to suit the situation. A robot may use audio communications when the user's back is turned, use visual communications when the user is facing the robot, or send the user a text message when the user is remote from the robot.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
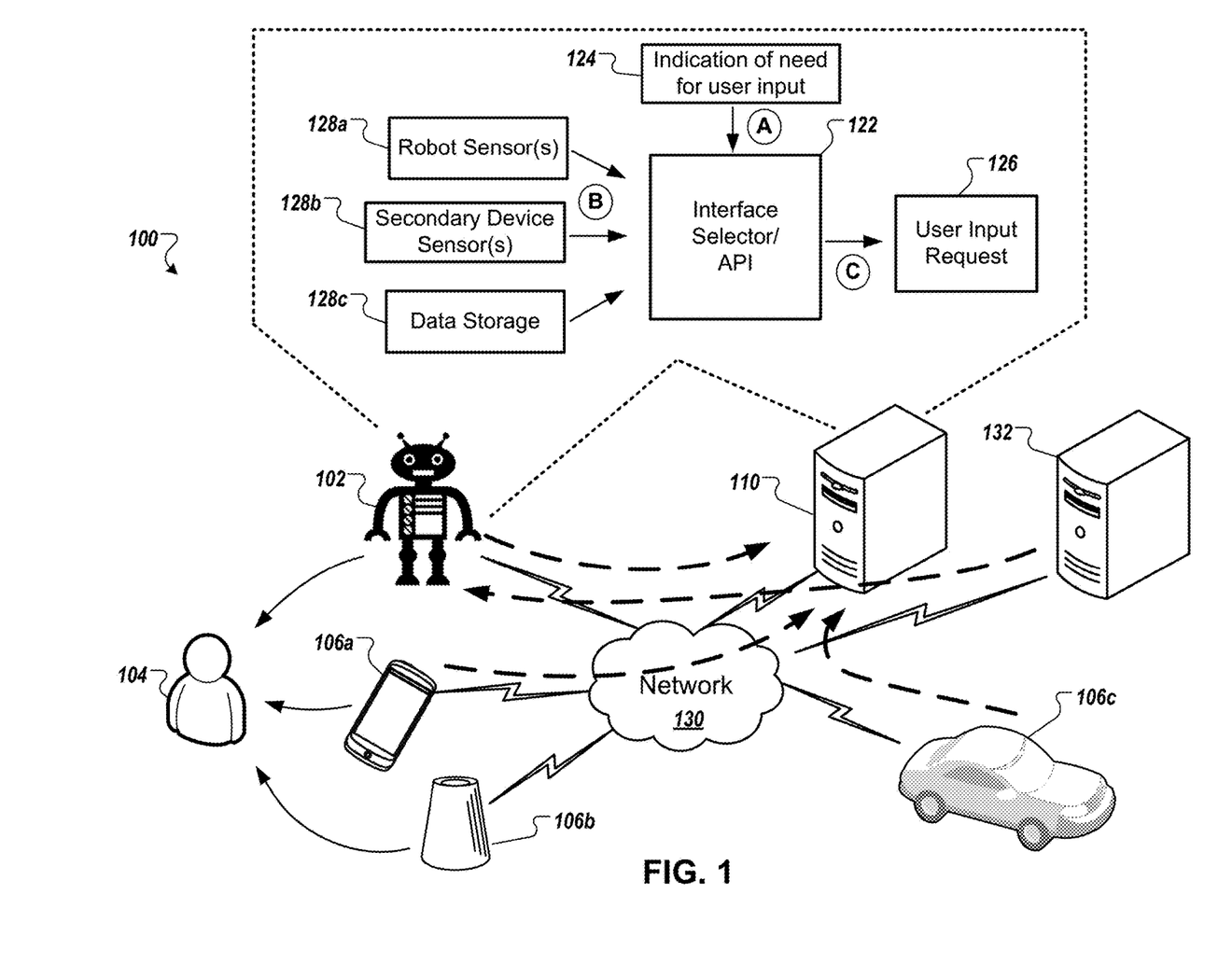
FIG. 1 is a diagram that illustrates an example of a system for selecting a modality for interfacing between a user and a robot.

FIG. 1 is a diagram that illustrates an example of a system 100 for selecting a modality for interfacing, e.g., communicating, between a user and a robot. The system 100 includes a robot 102 that can interface with a user 104. The system includes a user device 106a, an assistant device 106b, and a vehicle-based computing device 106c, collectively referred to herein as secondary devices 106. Robot 102 and secondary devices 106 communicate with a server system 110 over a network 130. Network 130 can include public and/or private networks and can include the Internet. Robot 102 and server system 110 can also communicate with an application server 132 to obtain information or cause requested actions to be performed.

Robot 102 can be a stationary robotic device or a mobile robotic device. Robot 102 can include a propulsion system, a navigation system, and various sensors to aid the robot in moving within an environment. Robot 102 can include a microphone, camera, touchscreen, speaker, or other interfaces that enable user 104 to provide inputs to and receive output from robot 102. Robot 102 can include a camera, microphone, accelerometers, GPS receiver, radar, and/or other sensors that enable robot 102 to obtain information about the surrounding environment and the location of user device 106a. Robot 102 is capable of performing actions with or without direct guidance from user 104. That is, robot 102 can be perform actions autonomously. While robot 102 may be capable of performing some actions autonomously, robot 102 may still require confirmation from a user for performing some actions. For example, robot 102 may require user confirmation to initiate an action, or robot 102 may require user confirmation or user input (e.g., a user password) to access information required to perform an action.

User device 106a can be a computing device, e.g., a mobile phone, smart phone, personal digital assistant (PDA), music player, tablet computer, a wearable computing device, laptop computer, desktop computer, or other portable or stationary computing device. User device 106a can feature a microphone, keyboard, touchscreen, speaker, or other interfaces that enable user 104 to provide inputs to and receive output from user device 106a. User device 106a can include a camera, accelerometers, GPS receiver, and/or other sensors that enable user device 106a to obtain information about the surrounding environment and the location of user device 106a.

Assistant device 106b can be an Internet-connected home assistant device. Assistant device 106b can include a microphone, a speaker, touchscreen, and/or other interfaces that enable user 104 to provide inputs to and receive output from assistant device 106b.

Vehicle-based computing device 106c can be a navigation system, an entertainment system, or other type of vehicle integrated computing system. Vehicle-based computing device 106c can include a microphone, a speaker, touchscreen, and/or other interfaces that enable user 104 to provide inputs to and receive output from vehicle-based computing device 106c.

The server system 110 can include one or more computers. In some implementations, one or more computers of the server system 110 perform data processing tasks such as speech recognition, text-to-speech processing, analysis of user requests, image analysis, facial recognition, voice recognition, gesture analysis, position analysis, and so on.

The application server 112 can be a server that supports one or more applications. The application server 112 can be a third-party server, operated independently of the server system 110. For example, the third-party server can be a back-end application server that provided information for display on or for the configuration of applications on the user device 106a. The server system 110 can communicate with multiple application servers 112, and each may correspond to a different application. For example, the server system 110 may communicate with a first application server to perform actions regarding a reminder application, with a second application server to perform actions regarding a calendar application, and so on.

Network 130 can include public and/or private networks and can include the Internet.

In various implementations, either robot 102 or server system 110 can perform some or all of the operations related to evaluating robot status and user status, and selecting interfacing modalities. However, for convenience, the operations are described as being performed primarily by server system 110. For example, server system 110 can include an interface selector 122 to collect data indicating the statuses of robot 102 and user 104 and select an appropriate interfacing modality using the collected data. Interface selector 122 can be implemented in hardware (e.g., as an FPGA or ASIC) or software, or a combination of both. Interface selector 122 can be implemented at a server system 110 or at robot 102. In some implementations, some of the operations of interface selector 122 can be performed by server system 110 and some can be performed by robot 102.

In some implementations, interface selector 122 can be accessed through an application program interface (API). The API can define a function or set of functions that can be called to request input or confirmation from a user. Each time this function is called, server system 110 executes the API to determine an interfacing mode appropriate for the current status of robot 102 and the user 104. As a result, software developers can use the standard function in the API to send a request to the system, which will cause the system to dynamically select an appropriate communication mode each time the function is called. In this manner, software developers need not designate a specific mode of communication or attempt to address all the possible situations that may arise. Instead, they can rely on the system to vary the mode of communicating with the user as appropriate for the current situation.

Although robot 102 may be an autonomous device, robot 102 may at times still require user input or user confirmation prior to performing an action. However, because robot 102 may operate autonomously, there will be times when user 104 will not be readily available to provide a required input. Consequently, when robot 102 requires a user input, it can coordinate with server system 110 to determine a user's 104 status relative to its own status at a given time to choose an appropriate interfacing modality to request the required input from the user 104. Interfacing modalities include direct and indirect modalities.

A direct modality refers to a user interfacing mode in which an autonomous device that requires user input (e.g., robot 102) directly communicates with the user. For example, an interfacing mode that uses the robot's own speaker and microphone to request and receive input from user 104 is an example of a direct interfacing modality. Direct interfacing modalities include, but are not limited to, audio modes, tactile modes, optical modes, and gesture-based modes.

An indirect modality refers to a user interfacing mode that uses one or more secondary devices 106 to interface with user 104. For example, sending an input request to a robot control application on the user's smartphone is an example of an indirect interfacing mode. Indirect interfacing modalities include, but are not limited to, sending a request through mobile application, sending an SMS message, sending an e-mail message, calling a user's telephone, and sending a request through a home assistant device. Moreover, indirect interfacing modalities can also include audio modes, tactile modes, optical modes, or gesture-based modes depending on the capabilities of the particular secondary device 106 used to provide the input request. For example, audio modes can include an audio and speech generation system on the robot 102 or a user device 106 in which the robot 102 or user device 106 provides a request for user input audibly to the user and a microphone and speech recognition system on the robot 102 or a user device 106 with which the robot 102 or user device 106 accepts a spoken input from a user. For example, tactile modes can include a touch input system on the robot 102 or a user device 106 which receives touch input from the user and a tactile output system on the robot 102 or a user device 106 which provides a tactile output to a user (e.g., a braille system). For example, optical modes can include graphic display and generation system on the robot 102 or a user device 106 in which the robot 102 or user device 106 provides a graphical output to a user and a camera and image recognition system on the robot 102 or a user device 106 in which the robot 102 or user device 106 accepts visual (e.g., gesture) input from a user (e.g., nodding one's head to confirm a request).

In brief, interface selector 122 receives an indication 124 that robot 102 requires user input to perform an action. In some instances, robot 102 may provide the indication 124. In some instances, an application executed by an application server 132 may provide the indication 124. For example, the application could be an application that controls an operation of robot 102 or an application that the robot 102 interacts with to carry out an action. For instance, if robot 102 requires access to a user account to perform a given action, robot 102 may interface with an application server 132 that manages the user account. Upon receiving a login request from the application server 132, robot 102 can send an indication 124 to interface selector 122 that the robot 102 requires the user's 104 login credentials to perform the action.

Interface selector 122 then obtains data related to robot 102 and user 104. Interface selector 122 can obtain data from data sources 128 such as robot sensors 128a, secondary device sensors 128b (sensors of one or more secondary devices 106), or data storage 128c. Data received from robot sensors 128a can include, but is not limited to, robot position data, audio data, image data, radar data, range finder data, and robot power level data (e.g., battery charge status). Data received from secondary device sensors 128b can include, but is not limited to, location data indicating the location of the particular device 106, accelerometer data, image data, usage data (e.g., how recently user 104 interacted with the device 106), and user identification data (e.g., an identification of one or more users near robot 102, or an identification of the user operating the device 106 in the case of a particular user being identified as driving a vehicle based the user being associated with a key of the vehicle). Data from data storage 128c can include, but is not limited to: user preferences; a user facial recognition profile; user schedules; user contact information (e.g., identification of secondary devices 106 associated with the user 104); and data that identifies capabilities, settings, or characteristics of robot 102.

Server system 110 processes the data to determine the status of user 104 relative to the status of robot 102. For example, interface selector 122 can provide the data to other computers in server system 110 to perform data processing operations on the data. Server system 110 can process position data to determine a level of proximity of user 104 with respect to robot 102. Interface selector 122 can process robot sensor data to develop environmental data that indicates environmental conditions in a region proximate to the robot. Server system 110 can process robot sensor data to determine user status data. Server system 110 can process secondary device data to determine a location of user 104, a status of user 104, or both. Server system 110 provides types of processed data to interface selector 122. For example, server system 110 can provide position data indicating a level of proximity between user 104 and robot 102, environmental data indicating conditions sensed by robot 102, user status data indicating a present status of user 104, robot status data indicating a present status of robot 102. As explained in more detail below, interface selector 122 then uses the processed data to select a particular interfacing mode for requesting the required input, and provides an input request 126 according to the selected mode.

Although described in reference to server system 110, in some implementations some or all of the operations of interface selector 122 may be performed by robot 102, or another computing device.

FIG. 1 also illustrates a flow of data, shown as stages (A) to (C), which represent a flow of data. Stages (A) to (C) may occur in the illustrated sequence, or in a sequence that is different from the illustrated sequence. For example, some of the stages may be occur concurrently. For convenience, operations of the stages (A) to (C) are describes as being performed by server system 110. However, as noted above, some or all of the operations may be performed by either server system 110, robot 102, or other computing systems.

In the example of FIG. 1, robot 102 requires user input to perform an action. For example, the robot 102 may need user input to respond to a request for user credentials from application server 132, or simply to confirm that a particular action should be carried out. Robot 102 provides an indication 124 to server system 110 that user input is required, and indicates details of type of input required (e.g., a username and password). In response to receiving the indication 124, server system 110 obtains data from data sources 128 to evaluate the status of user 104 relative to robot 102. Server system 110 processes the data and provides data such as position data, environmental data, user status data, and robot status data to interface selector 122. Interface selector 122 uses the processed data to determine the status of user 104 relative to robot 102 and select an appropriate interfacing modality for robot 102 to interface with user 104 to obtain the required input. Interface selector 122 provides an input request to an appropriate device (robot 102 or one or more secondary devices 106) to present to user 104.

In further detail, at stage (A), robot 102 attempts to perform an action that requires accessing information from a user account hosted by application server 132. Application server 132 requires user login credentials to provide the information. In order to interface with user 104, robot 102 indicates to server system 110 that it requires user input to perform the action. In addition, robot 102 may provide details about the input required including, the type of input, an identity of the user from whom the input is needed, if necessary, etc. In some implementations, a class of actions that triggers interface selection is any action which requires the robot to enter an area or perform a process that has been defined by the user as requiring confirmation. For example, robot 102 may be configured to only operate fully-autonomously in some rooms in a home, and may require confirmation input before entering other rooms. Similarly, robot 102 may be configured to autonomously interact with some objects or classes of objects (e.g., picking up toys, cleaning dishes) in a home, but may require user confirmation before interacting with other objects or classes of objects (e.g., cleaning antique china). In some implementations, robot 102 could reason about which objects are of especially-high value (e.g., porcelain dishes) or especially sensitive (e. g. a private diary) and could automatically determine that manipulating these objects should require user confirmation.

At stage (B), server system 110, robot 102, or both obtain data related to the respective statuses with robot 102 and user 104 from data sources 128. Robot 102 may send sensor data to server system 110 concurrently with sending the indication 124 that the action requires user input. Data received from robot sensors 128a can include, but is not limited to, robot position data, audio data, image data, radar data, range finder data, and robot power level data (e.g., battery charge status).

Server system 110 can access a profile of the user 104 and the robot 102 from data storage 128c to identify secondary devices associated with the user 104 and/or robot 102 from which additional user status or robot status data can be obtained. For example, a user profile can include, but is not limited, to identification information for secondary devices 106 registered to the user, e.g., a phone, a tablet computer, a wearable device, and so on. Server system 110 can query one or more of the secondary devices 106 registered to user 104 to obtain data related to the status of user 104. For example, data received from secondary device sensors 128b can include, but is not limited to, location data indicating the location of the particular device 106, accelerometer data, image data, usage data (e.g., how recently user 104 interacted with the device 106), and user identification data (e.g., an identification of the user operating the device 106 in the case of a particular user being identified as driving a vehicle based the user being associated with a key of the vehicle).

Server system 110 can access data from data storage 128c. Data from data storage 128c can include, but is not limited to, user preferences, a user facial recognition profile, a user speech recognition profile, user schedules, user contact information (e.g., user e-mail address and phone number), and data that identifies capabilities, settings, or characteristics of robot 102.

Server system 110, robot 102, or both process the data to determine the status of user 104 relative to the status of robot 102. For example, server system 110 can process data from robot sensors 128a to determine the position of robot 102. Server system 110 can further process data from robot sensors 128a, e.g., image data or audio data, to determine environmental conditions proximate to robot 102. For example, server system 110 can perform image analysis on image data to identify objects or people near robot 102. Server system can perform facial recognition analysis on image data to identify people and determine whether user 104 is within a line of sight of robot 102, or whether user 104 is facing towards or away from robot 102. Server system 110 can perform audio analysis on audio data to determine the background noise level near robot 102, and voice recognition to identify people within hearing range of robot 102.

Furthermore, server system 110, robot 102, or both can organize the processed data into data sets that are relevant to choosing an appropriate interfacing modality. For example, server system 110 can generate data sets including, but not limited to, position data that indicates a level of proximity of user 104 to robot 102, environmental data that indicates environmental conditions in the region proximate to robot 102, user status data that indicates the status of user 104, and robot status data that indicates the status of robot 102. The proximity level may indicate not only a distance between user 104 and robot 102 but may also include, but is not limited to, which rooms of a building the user and robot are in, whether the rooms are on the same level of the building, whether the user and robot are within line of sight of each other, whether the user and robot are within arms-reach of each other, and whether the user and robot are within hearing range of each other.

The environmental conditions indicated by the environmental data may provide information including, but not limited to, audio noise in the region, visual noise in the region, obstacles around which the robot may be required to navigate, and a floor plan of a building or a map of the region.

The user status indicated by the user status data may provide information including, but not limited to, the identity of a user or users near the robot, where the user is facing, whether the user is engaged in an activity, user preferences for interacting with the robot, upcoming or ongoing events in the user's calendar, and whether the user has a disability that affects interfacing with the robot (e.g., if the user is hearing impaired). In other words, the user status data may indicate a non-location based status of the user.

The robot status indicated by the robot status data may provide information including, but not limited to, characteristics and capabilities of the robot, which direct interfacing modalities the robot is capable of using, the status of the robot's battery charge, and whether the robot is being charged and unable to move.

Server system 110, robot 102, or both provide the processed data to interface selector 122, which, as noted above, can be a module of the server system 110, the robot 102, or can represent the operations performed in part by the server system 110 and in part by the robot 102.

During stage (C), interface selector 122 selects an appropriate interfacing mode and provides an input request according to the selected interfacing mode. For example, interface selector 122 can select from among multiple direct and indirect interfacing modalities. A direct modality refers to a user interfacing mode in which robot 102 directly interfaces with user 104. For example, an interfacing mode that uses the robot's own speaker and microphone to request and receive input from user 104 is an example of a direct interfacing mode. Direct interfacing modalities include, but are not limited to, audio modes, tactile modes, optical modes, and gesture-based modes. An indirect modality refers to a user interfacing mode in which communication with the user 104 occurs using one or more secondary devices 106. For example, sending an input request to a robot control application on the user's smartphone is an example of an indirect interfacing mode. Indirect interfacing modalities include, but are not limited to, sending a request through mobile application, sending an SMS message, sending an e-mail message, calling a user's telephone, and sending a request through a home assistant device. Moreover, indirect interfacing modalities can also include audio modes, tactile modes, optical modes, or gesture-based modes depending on the capabilities of the particular secondary device 106 used to provide the input request.

Figure 2A:
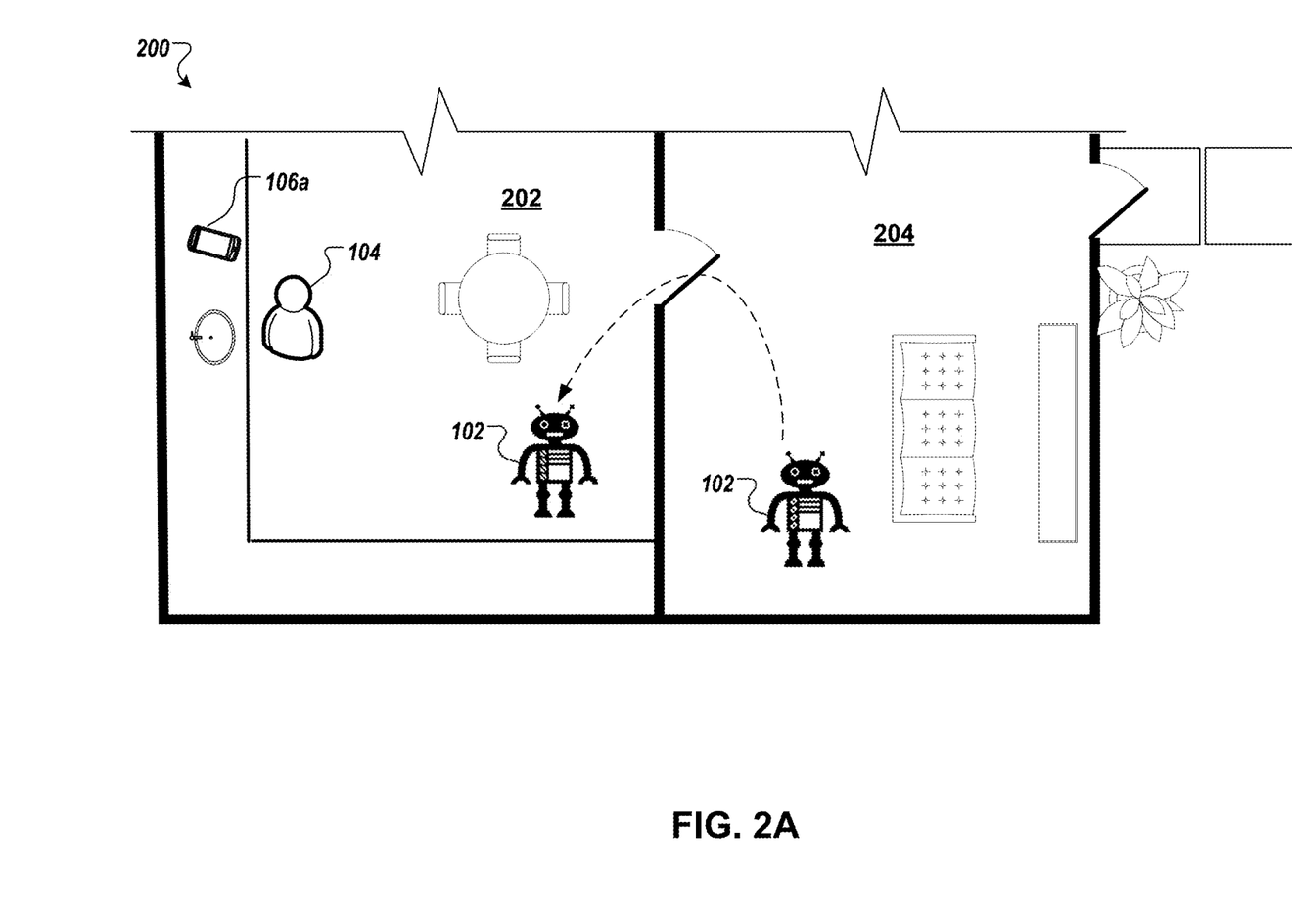
FIGS. 2A-2B are a diagrams that illustrates operations of the system of FIG. 1 in example contexts.

Interface selector 122 selects an appropriate interfacing mode for a given situation based on the position data, environmental data, user status data, robot status data, or a combination thereof. For example, if the position data indicates that robot 102 is within range of user 104 to communicate through one or more direct interfacing modes, interface selector 122 can select an interfacing mode from among the direct interfacing modes. Referring to FIG. 2A, the position data may indicate that robot 102 and user 104 are located in the same room (e.g., the kitchen 202) of the user's home 200. Interface selector 122 can, therefore, determine that user 104 is within range of several different direct interfacing modes, e.g., audio, visual, and touch modes. Interface selector 122 can then use other data to select from the direct interfacing modes. For example, the user status data may indicate that the user's preferred interfacing method is visual, so interface selector 122 may select a visual interfacing mode and send instructions to the robot to display a graphical input request 126 using a visual interfacing mode.

As another example, the proximity level indicated by the position data may indicate that user 104 is too far away from robot 102 for touch interfacing (e.g., using a touch screen), so interface selector 122 may limit the types of communication used by selecting from only audio and visual direct interfacing modes. Moreover, environmental data, user status data, or both may indicate that user 104 is facing away from the robot 102. For example, user 104 may be washing dishes with his back turned to robot 102. Consequently, interface selector 122 may determine that a visual interfacing mode is not appropriate based on such environmental or user status data. In response, interface selector 122 may select to use an audio interfacing mode.

In another example, the position data may indicate that robot 102 is in a different room from user 104. For example, robot 102 may be in the living room 204, while user 104 is in the kitchen 202. In such a case, the position data may indicate that the proximity level between user 104 and robot 102 is not sufficient for visual or touch interfacing modes, but is still sufficient for audio modes. Thus, interface selector 122 can select a direct audio interfacing mode or an indirect interfacing mode. Interface selector 122 may either send the robot instructions to interface with user 104 using an audio interface at an increased volume, or send the input request 126 to the user's user device 106a.

Interface selector 122 may also determine based on environmental data, robot status data, or both that robot 102 can navigate closer to user 104. For example, interface selector 122 may determine that robot 102 can navigate to the kitchen 202 and within range of one or more additional direct interfacing modalities. For example, interface selector 122 can send instructions to robot 102 to navigate closer to user 104 and interface with user 104 using a particular direct interfacing mode such as a visual mode. The navigation instructions may vary depending the degree of autonomy of the robot. For instance, if robot 102 has a high degree of autonomy and knows the layout of the home 200, interface selector 122 may simply send data to the robot that indicates the user's location and robot 102 can navigate to that location. In other implementations, interface selector 122 may provide more detailed navigation instructions.

In some implementations, proximity levels for various interfacing modes may be dynamic. For example, proximity levels may vary based on variables such as environmental factors, such as, e.g., audio noise or visual clutter and characteristics of the robot 102 (e.g., maximum volume of speakers and sensitivity of a microphone). For example, an audio mode may be considered appropriate a distance between user 104 and robot 102 of up to 20 feet. If ambient audio levels are above a threshold (e.g., when music is playing or other loud sounds are present), the system may consider the audio mode appropriate at only a distance of up to 10 feet. In addition, or as an alternative, the robot 104 can adjust its output volume level based on the detected ambient audio level so that the user can hear the output over the ambient audio.

In some implementations, interface selector 122 may still be permitted to select from indirect interfacing modes even if the position data indicates that robot 102 is within range of a user for using direct interfacing modes. For example, a particular user's user status data may indicate a preference for interfacing over a smartphone. So, interface selector 122 provide user requests to that particular user through the user's smartphone even if robot 102 is within range of direct interfacing modes. As another example, user status data may indicate preferences for a particular type(s) of interfacing mode(s) at different times of the day. For example, between 8:30 PM and 7:30 AM user 104 may prefer to use non-audio interfacing modes so as not to wake a sleeping child. The user status data may indicate such preferences. Consequently, interface selector 122 may select from only non-audio interfacing modes between 8:30 PM and 7:30 AM.

Figure 2B:
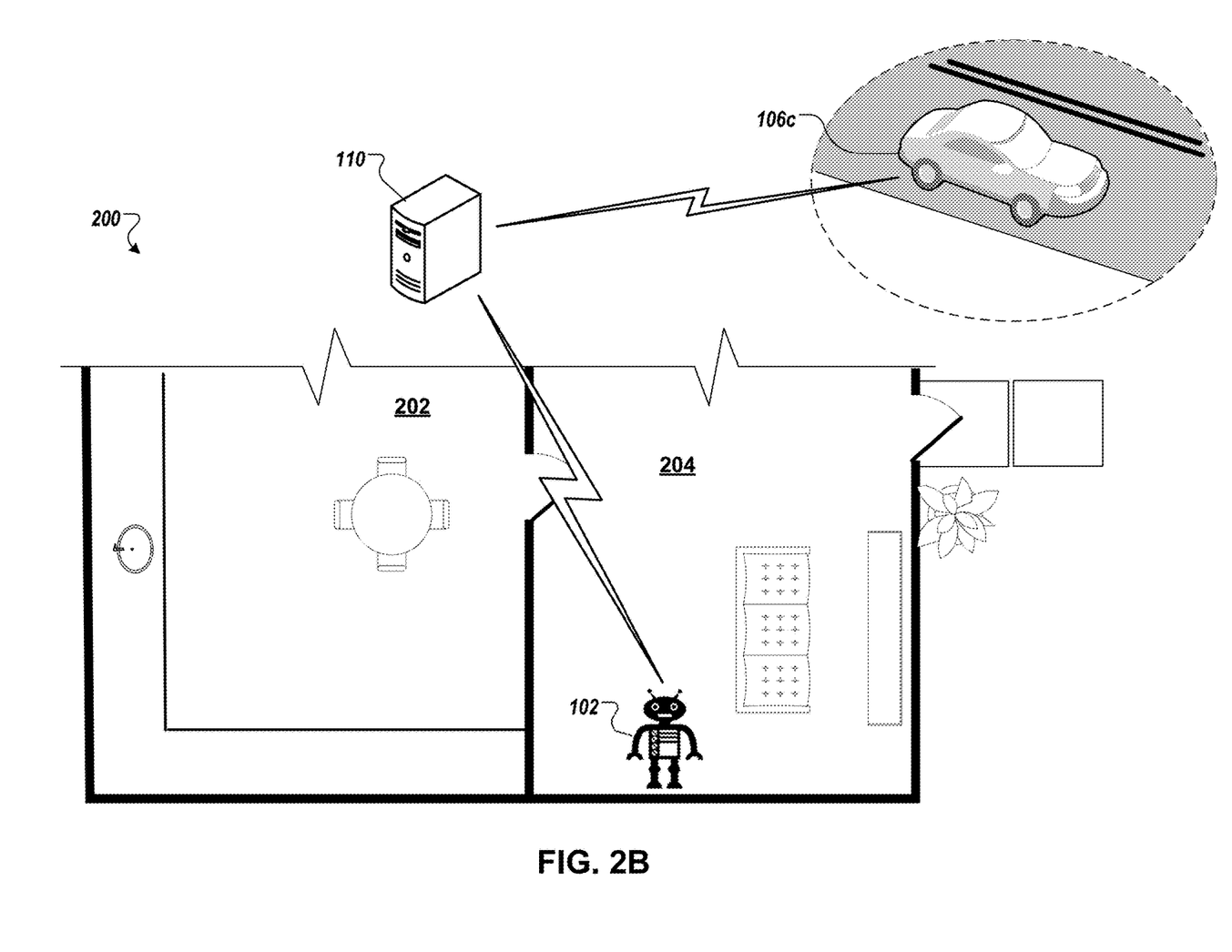

If the position data indicates that the user 104 is outside of a range of the direct communication modes, interface selector 122 selects an appropriate interfacing mode from the indirect interfacing modes. For instance, if, as illustrated in FIG. 2B, the position data indicates that user 104 is away from home 200, then interface selector 122 selects an indirect interfacing mode for requesting the user input. For example, interface selector 122 can cause server system 110 to send the input request 126 to the user's smartphone or smartwatch as a notification in a mobile application. If the user status data indicates that the user is at work (e.g., based on the user's schedule), interface selector 122 can cause server system 110 to send the input request to the user's work e-mail address. If the user status data indicates that user 104 is engaged in an activity such as driving vehicle, interface selector 122 can select an indirect interfacing mode that does not disturb the activity. For example, if user 104 is driving and the user status data indicates that user's vehicle includes a vehicle based computing device 106c, interface selector 122 can cause server system 110 to send the input request as an audio interfacing mode to the vehicle-based computing device 106c (e.g., as an audio request through an internet connected vehicle entertainment system). In any case, after receiving the request input from user 104 the secondary device 106 transmits the input back to server system 110 which, in turn, transmits the input to robot 102.

Figure 3A:
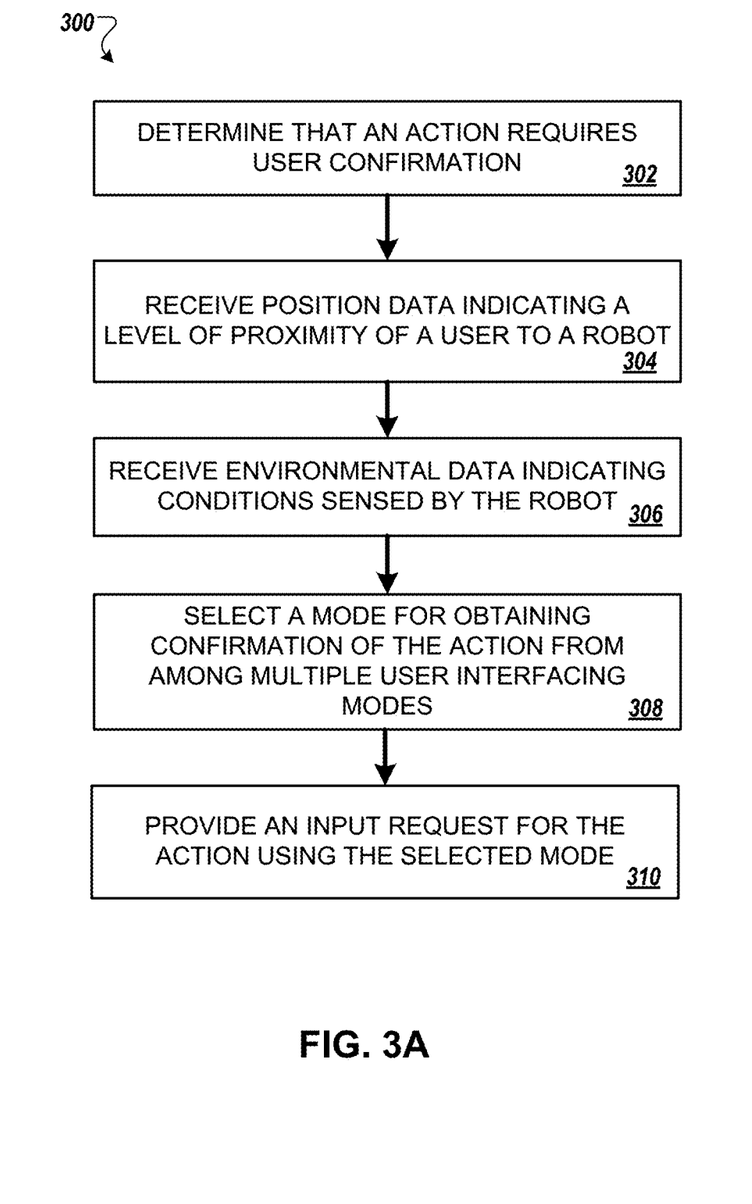
FIGS. 3A and 3B are a flow diagrams that illustrates example processes for selecting a modality for interfacing between an autonomous device and a user.
Figure 3B:
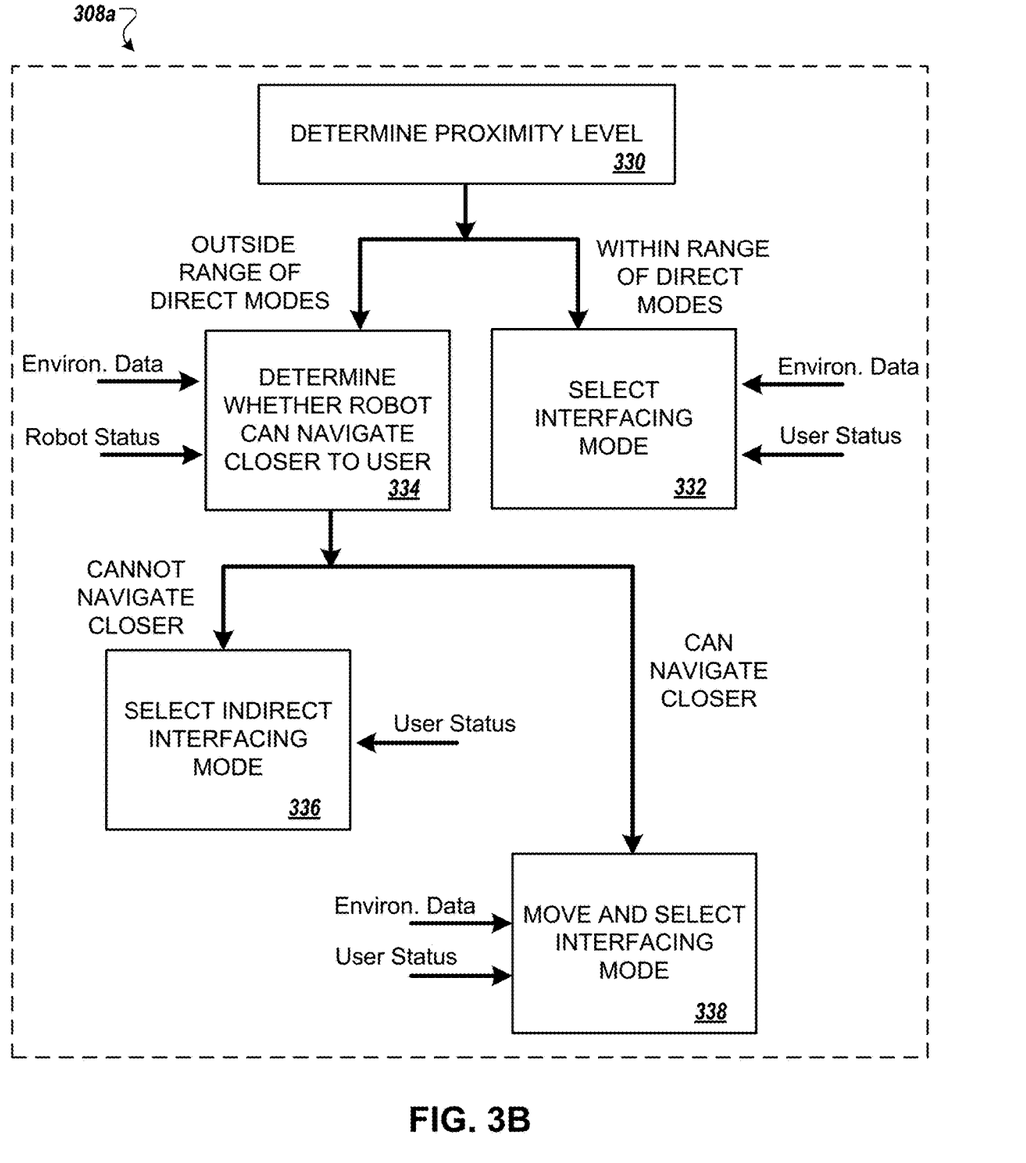

FIGS. 3A and 3B are flow diagrams that illustrate a process 300 for interfacing between an autonomous device and a user. The process 300 can be performed by one or more processing devices. The one or more processing devices can include a client device, a server system, or a combination of both a client device and a server system. In some implementations, the actions of the process 300 may be performed exclusively by a client device or a server system. As additional examples, a processing device may be a robot, a mobile phone, smart phone, personal digital assistant (PDA), music player, tablet computer, wearable computing device such as a watch, laptop computer, desktop computer, or other portable or stationary computing device. As additional examples, a processing device may be a central processing unit (CPU) of a device, a particular processing core within a CPU, and so on. For example, as discussed above, the techniques may be performed by the robot 102 or server system 110 of FIG. 1. For convenience, operations of process 300 are described as being performed by a server system. However, as noted above, some or all of the operations may be performed by either a server system 110, an autonomous device (e.g., robot 102), or other computing systems.

The server system determines that an action requires user confirmation (302). For example, a server system can receive data indicating that an autonomous device requires user input or user confirmation before performing a particular action. For example, a robot may be attempting to perform an action that requires user login credentials for a user account, and therefore, the robot must interface with the user to obtain the required credentials. The server system can receive the indication from the robot that the robot must interface with a user in order to perform the action. The indication can include information related to the user input or user confirmation required in order to perform the action. For example, the indication can include information indicating the action to be performed, information indicating the required user input, information identifying a particular user from whom the input is required, an indication of alternate users who may be able to provide the required information or confirmation, a location of the robot, or any combination thereof. In some implementations, the indication may be a function call for an API process.

In some implementations, the server system determines whether an action requires user confirmation based on a combination of on-robot and server-side data. For example, perception software running on the robot can classify objects as particularly sensitive (e.g., porcelain dishes) based on physical attributes and server-side configuration data entered by users could inform this decision as well. For example, the perception software may recognize that an object is made of a fragile material such as glass or porcelain and server-side user-specific preference data may indicate that all objects in the china cabinet require confirmation before manipulation.

The server system receives position data indicating a level of proximity of a user to a robot (304). The server system receives environmental data indicating conditions senesce by the robot (306). For example, server system can obtain position data for the robot and the user, and sensor data from the robot. The server system may receive one or both of the location information associated with the robot and sensor data as part of the indication that the robot requires user input to perform the action. The server system can query one or more secondary devices associated with a particular user from whom information is required to obtain information related to the user. In some implementations, server system can query secondary devices associated with more than one user from whom the required information may be obtained to access information related to each of the users. The accessed information can include can include, but is not limited to, location data indicating the location of the particular device 106, accelerometer data, image data, usage data (e.g., how recently user 104 interacted with the device 106), and user identification data (e.g., an identification of the user operating the device 106 in the case of a particular user being identified as driving a vehicle based the user being associated with a key of the vehicle).

The server system can process the position information and sensor data from the robot and the data obtained from the secondary devices to determine, for example, the relative position of the user (or users) with respect to the robot. For example, the server system can perform image analysis on image data from the robot to identify objects or people near robot. The server system can perform facial recognition analysis on the image data to identify people and determine whether a user is within line of sight of the robot, or whether a user is facing towards or away from the robot. The server system can perform audio analysis on audio data to determine the background noise level near the robot, or voice recognition to identify people within hearing range of the robot, or both.

Furthermore, the server system can organize the processed data into data sets that are relevant to choosing an appropriate interfacing modality. For example, the server system can generate data sets including, but not limited to, position data that indicates a level of proximity of one or more identified users to the robot, environmental data that indicates environmental conditions in the region proximate to the robot, user status data that indicates the status of one or more identified user, and robot status data that indicates the status of the robot. The proximity level may indicate not only a distance between a user and a robot, but may also include data indicating one or more of the following: which rooms of a building the user and robot are in, whether the rooms are on the same level of the building, whether the user and robot are within line of sight of each other, whether the user and robot are within arms-reach of each other, and whether the user and robot are within hearing range of each other.

The environmental conditions indicated by the environmental data may provide information including, but not limited to, audio noise in the region, visual noise in the region, obstacles around which the robot may be required to navigate, and a floor plan of a building or a map of the region.

The user status indicated by the user status data may provide information including, but not limited to, the identity of a user or users near the robot, where the user is facing, whether the user is engaged in an activity, user preferences for interacting with the robot, upcoming or ongoing events in the user's calendar, and whether the user has a disability that affects interfacing with the robot (e.g., if the user is hearing impaired).

The robot status indicated by the robot status data may provide information including, but not limited to, characteristics and capabilities of the robot, which direct interfacing modalities the robot is capable of using, the status of the robot's battery charge, and whether the robot is being charged and unable to move.

Server system selects a mode for obtaining confirmation of the action from among multiple interfacing modes (308). For example, server system can select from among multiple direct and indirect interfacing modalities. Direct interfacing modalities include, but are not limited to, audio modes, tactile modes, optical modes, and gesture-based modes. Indirect interfacing modalities include, but are not limited to, sending a request through mobile application, sending an SMS message, sending an e-mail message, calling a user's telephone, and sending a request through a home assistant device. Moreover, indirect interfacing modalities can also include audio modes, tactile modes, optical modes, or gesture-based modes depending on the capabilities of the particular secondary device 106 used to provide the input request.

The server system can select an appropriate interfacing mode for a given situation based on the position data, environmental data, user status data, robot status data, or a combination thereof. For example, the server system can use a hierarchical process such as that shown in FIG. 3B for selecting an appropriate interfacing mode based on the position data, environmental data, user status data, robot status data. FIG. 3B illustrates a flow diagram of an example sub-process 308a that that can be implemented as part of process step 308.

For example, server system can first determine whether the proximity level indicates that the user is within the range of the robot's direct interfacing modes or that the user is outside the range of one or more of the robot's direct interfacing modes (330). If the server system determines that the level of proximity between the user and the robot is within a range of one or more direct interfacing modes, server system can select an appropriate interfacing mode from among the direct interfacing modes, the indirect interfacing modes, or both (332). For example, once it has been determined that the user is within range for any of the direct interfacing modes, the server system can use the environmental data and user status data to further narrow the available interfacing options, and to select the most appropriate one. For example, the server system can use the user status data to determine the user's preferred interning mode at a particular time is a non-audio mode (e.g., the users may prefer non-audible modes after a certain time when children are sleeping). The server system can then select a non-audio direct interfacing mode based on the user's status data. As another example, the environmental data may indicate that the user is facing away from the robot and unable to see a visual interfacing mode. Accordingly, the server system may select an audio direct interfacing mode or an indirect interfacing mode (e.g. sending a message to the user's smartwatch) based on the environmental data.

On the other hand, if the server system determines that the level of proximity between the user and the robot is outside of a range the direct interfacing modes, server system can use environmental data and robot status data to determine whether the robot can navigate closer to the user (334). For example, the server system can determine whether the user is within a range that the robot can navigate based on the capabilities of the robot (e.g., battery charge, capabilities of the robot's propulsion system). For example, if the robot is located on a ground floor and the user is on an upper floor, the robot may not have a propulsion system that is capable of clinging stairs, and therefore, the robot may not be able to navigate closer to the user. As another example, the user may be located in the back yard and the robot may be capable of navigating to the user's back porch to within range of an audio interfacing mode of the user.

If the server system determines that the robot cannot navigate closer to the user to within range of one or more direct interfacing modes, the server system can select an interfacing mode from among the indirect interfacing modes (336). For example, the server system can user the user status data to select an appropriate indirect interfacing mode for interfacing between the user and the robot. The server system can select which secondary device to use to interface with the user. For example, based on the time of day and the user's schedule the, server system can select an appropriate secondary device for interfacing with the user. For example, if the user input is required when the user is at work, the server system may select use the user's work e-mail as an interfacing mode. If the user's input is required when the user is performing a particular activity (e.g., driving a vehicle), the server system can select an indirect interfacing mode that does not interfere with the activity. For example, the server system can select to use an audio interface through the user's vehicle-based computing system.

If the server system determines that the robot can navigate closer to the user to within range of one or more direct interfacing modes, the server can send the robot instructions to move closer to the user and select an interfacing mode from among either the direct interfacing modes (338). For example, the server system can use the environmental data and user status data to select an appropriate direct interfacing mode as described above in reference to step 332.

Referring again to FIG. 3A, after selecting an appropriate interfacing mode, the server system provides an input request for the action using the selected interfacing mode (310). For example, the server system can send instructions to the robot to interface with the user using a selected direct interfacing mode. If an indirect interfacing mode was selected, the server system can send instructions to one or more of the secondary devices to present an appropriate input request to the user. For example, sever system can send a notification to a robot interfacing application on the user's smartphone or smartwatch. The server system can send an e-mail or text message to the user. The server system can use a virtual calling system to call the user's telephone and request the input.

In some implementations, the server system can determine that a particular user input requires the use of an interfacing mode that protects the user's privacy. In response, the server system can select an indirect or direct interfacing mode that maintains the user's privacy. For example, if the environmental data or user status data indicates that the user is located in a public location, the server system may refrain from using audio interfaces.

In some implementations, the server system can provide instructions to adjust characteristics of the selected interfacing mode. For example, if the environmental data indicates that the environment is noisy, the server system can provide instructions to the robot to adjust the volume or set a particular volume level for an audio interfacing mode. In such an example, the server system may also provide instructions to adjust a microphone gain. As another example, if the environmental data indicates that the environment is bright (e.g., outside in sunlight), the server system can provide instructions to the robot or a secondary device (e.g., smartphone) to increase the brightness of a display or set a particular brightness level for a visual interfacing mode.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method executed by one or more processors, the method comprising:
   determining that a particular action requires user confirmation before being performed;
   receiving position data indicating a level of proximity of a user to a robot and environmental data indicating environmental conditions sensed by the robot;
   in response to determining that the particular action requires user confirmation before being performed, selecting, by the one or more processors and based on one or more of the position data and the environmental data, a particular mode for obtaining confirmation of the action from among multiple modes of interfacing with users; and providing, by the one or more processors and for presentation to the user, an input request for the action using the particular mode.

2. The method of claim 1, wherein selecting the particular mode for obtaining confirmation of the action from among the multiple modes of interfacing with users comprises:
   determining, based on the position data, that the level of proximity between the user and the robot is within a range of one or more direct interfacing modes; and
   based on determining that the level of proximity between the user and the robot is within the range of the one or more direct interfacing modes, selecting the particular mode for obtaining confirmation of the action from among the one or more direct interfacing modes.

3. The method of claim 2, wherein the one or more direct interfacing modes comprise one or more of: an audio mode, a touch mode, or an optical mode.

4. The method of claim 1, wherein selecting the particular mode for obtaining confirmation of the action from among the multiple modes of interfacing with users comprises:
   determining, based on the position data, that the level of proximity between the user and the robot is outside a range of one or more direct interfacing modes; and
   based on determining that the level of proximity between the user and the robot is outside the range of one or more direct interfacing modes, selecting the particular mode for obtaining confirmation of the action from among one or more indirect interfacing modes.

5. The method of claim 4, wherein the one or more indirect interfacing modes comprise one or more of: sending a request through mobile application, sending an SMS message, sending an e-mail message, calling a user's telephone, or sending a request through a home assistant device.

6. The method of claim 1, wherein selecting the particular mode for obtaining confirmation of the action from among the multiple modes of interfacing with users comprises:
   determining, based on the position data, that the level of proximity between the user and the robot is outside of a range for using one or more direct interfacing modes;
   determining that the robot can navigate to a distance that is within the range for using one or more direct interfacing modes;
   causing the robot to navigate closer to the user and within range for use of a direct interfacing mode; and
   selecting the direct interfacing mode.

7. The method of claim 6, wherein determining that the robot can navigate to a distance that is within the range for using one or more direct interfacing modes comprises determining, based on the environmental data, that the robot can navigate to a distance that is within the range for using one or more direct interfacing modes.

8. The method of claim 7, wherein the environmental data indicates conditions in a region proximate to the robot.

9. The method of claim 1, further comprising obtaining user status data indicating a non-location based status of the user, and
   wherein the particular mode for obtaining confirmation of the action is selected from among one or more direct interfacing modes.

10. The method of claim 9, wherein selecting the particular mode for obtaining confirmation of the action from among the multiple modes of interfacing with users comprises:
   determining, based on the position data, that a distance between the user and the robot within a range of one or more direct interfacing modes;
   determining, based on the user status data, that the user is unable to see an optical interfacing modes; and
   selecting the particular mode for obtaining confirmation of the action from among non-optical modes of the one or more direct interfacing modes.

11. The method of claim 1, further comprising determining that the particular action that requires confirmation requires privacy, and wherein selecting the particular mode for obtaining confirmation of the action from among the multiple modes of interfacing with users comprises selecting a mode that maintains the user's privacy.

12. The method of claim 1, wherein providing the input request for the action using the particular mode comprises causing the robot to provide the request.

13. The method of claim 12, wherein causing the robot to provide the request comprises causing the robot to adjust a characteristic of the particular mode to account for the environmental conditions indicated by the environmental data.

14. The method of claim 13, wherein causing the robot to adjust a characteristic of the particular mode to account for the environmental conditions comprises causing the robot to adjust a volume for an audio mode.

15. The method of claim 13, wherein causing the robot to adjust a characteristic of the particular mode to account for the environmental conditions comprises causing the robot to adjust a display for an optical mode.

16. The method of claim 13, wherein causing the robot to adjust a characteristic of the particular mode to account for the environmental conditions comprises causing the robot to adjust a microphone gain for an audio mode.

17. The method of claim 13, wherein causing the robot to adjust a characteristic of the particular mode to account for the environmental conditions comprises causing the robot to navigate to within a line of sight of the user for an optical mode.

18. A system comprising:
   one or more processors and one or more storage devices storing instructions that are operable, when executed by the one or more processors, to cause the one or more processors to perform operations comprising:
      determining that a particular action requires user confirmation before being performed;
      receiving position data indicating a level of proximity of a user to a robot and environmental data indicating environmental conditions sensed by the robot;
      in response to determining that the particular action requires user confirmation before being performed, selecting, based on one or more of the position data and the environmental data, a particular mode for obtaining confirmation of the action from among multiple modes of interfacing with users; and
      providing, for presentation to the user, an input request for the action using the particular mode.

19. An autonomous device comprising:
   one or more processors;
   one or more sensors coupled to the one or more processors; and
   one or more storage devices storing instructions that are operable, when executed by the one or more processors, to cause the one or more processors to perform operations comprising:
      determining that a particular action requires user confirmation before being performed by the device;
      obtaining sensor data from the one or more sensors, the sensor data indicating environmental conditions in a proximity of the device;

receiving position data indicating a level of proximity of a user to the device;

in response to determining that the particular action requires user confirmation before being performed, obtaining data indicating a particular mode for obtaining confirmation of the action, wherein the particular mode is selected, from among multiple modes of interfacing with users, based on one or more of the position data and the sensor data; and providing, for presentation to the user, an input request for the action using the particular mode.

20. One or more non-transitory computer-readable storage media storing a computer program, the program comprising instructions that when executed by one or more processors cause the one or more processors to perform operations comprising:

determining that a particular action requires user confirmation before being performed;

receiving position data indicating a level of proximity of a user to a robot and environmental data indicating environmental conditions sensed by the robot;

in response to determining that the particular action requires user confirmation before being performed, selecting, based on one or more of the position data and the environmental data, a particular mode for obtaining confirmation of the action from among multiple modes of interfacing with users; and providing, for presentation to the user, an input request for the action using the particular mode.

* * * * *